United States Patent [19]

Itoh et al.

[11] Patent Number: 5,391,700
[45] Date of Patent: Feb. 21, 1995

[54] PROCESS FOR PRODUCING POLYESTER BY RING-OPENING COPOLYMERIZATION

[75] Inventors: Hiroshi Itoh, Kobe; Takashi Namba, Suita; Hiroya Kobayashi, Minoo; Masashi Yukitake, Suita, all of Japan

[73] Assignee: Nippon Shokubai Co., Ltd., Osaka, Japan

[21] Appl. No.: 233,649

[22] Filed: Apr. 26, 1994

[30] Foreign Application Priority Data

| Apr. 27, 1993 | [JP] | Japan | 5-100746 |
| Apr. 27, 1993 | [JP] | Japan | 5-100747 |
| Aug. 17, 1993 | [JP] | Japan | 5-203071 |
| Aug. 31, 1993 | [JP] | Japan | 5-215631 |
| Jan. 26, 1994 | [JP] | Japan | 6-006780 |

[51] Int. Cl.$^6$ ............................................. C08G 63/42
[52] U.S. Cl. ............................... 528/297; 528/272; 528/276; 528/279; 528/281; 528/282; 528/287; 528/288; 528/293; 528/392; 525/437
[58] Field of Search ............... 528/272, 276, 279, 281, 528/282, 287, 288, 293, 297, 392; 525/437

[56] References Cited

U.S. PATENT DOCUMENTS

| 4,954,572 | 9/1990 | Emert et al. | 525/285 |
| 5,057,617 | 10/1991 | Emert et al. | 548/557 |

FOREIGN PATENT DOCUMENTS

| 42-26708 | 12/1967 | Japan . |
| 55-145733 | 11/1980 | Japan . |
| 55-145734 | 11/1980 | Japan . |
| 55-161823 | 12/1980 | Japan . |
| 61-47728 | 3/1986 | Japan . |
| 531570 | 5/1993 | Japan . |
| 641288 | 2/1994 | Japan . |

OTHER PUBLICATIONS

Polymer Preprints, Japan vol. 42, No. 2 (1993) p. 424 Published May 12, 1993.
Kobanshi Ronbunshu, Japan vol. 50, No. 10, pp. 723–729 Published Oct., 1993.

*Primary Examiner*—Samuel A. Acquah
*Attorney, Agent, or Firm*—Roylance, Abrams, Berdo & Goodman

[57] ABSTRACT

This invention provides a process for producing with industrially good efficiency a polyester having a high melting point and biodegradability. In this process, ring-opening copolymerization of a cyclic acid anhydride containing succinic anhydride as a main component with a cyclic ether containing ethylene oxide as a main component is carried out in the presence of a catalyst by introducing successively the cyclic ether into a reaction vessel containing the cyclic acid anhydride in a melting state or solution state. The rate per hour of introducing the cyclic ether is within the range of 3 to 90 parts by weight per 100 parts by weight of the cyclic acid anhydride, and the reaction vessel has an inside pressure within the range of atmospheric pressure to 50 kgf/cm$^2$ as a gauge pressure.

12 Claims, No Drawings

PROCESS FOR PRODUCING POLYESTER BY RING-OPENING COPOLYMERIZATION

BACKGROUND OF THE INVENTION

The present invention relates to a process for producing a polyester. More particularly, the invention relates to a process for producing a polyester, comprising a step of performing a ring-opening copolymerization reaction of a cyclic acid anhydride containing succinic anhydride as a main component with a cyclic ether containing ethylene oxide as a main component.

An aliphatic polyester has biodegradability and is used for a packing material and the like by combining one or more kinds of additives with the polyester to mold the resulting composition into a sheet or film shape. As a process for producing such a polyester, there is generally performed a process comprising esterifying directly a dicarboxylic acid and a glycol or performing a transesterification reaction between an alkyl ester of a dicarboxylic acid and a glycol to produce a glycol ester and/or an oligomer thereof and then heating the glycol ester and/or oligomer thereof with stirring Under a high vacuum for a long period of time to perform a polycondensation reaction.

However, the process, which comprises performing a polycondensation reaction by heating with stirring under a high vacuum for a long period of time, needs a vacuum apparatus and high power to maintain a high vacuum. Therefore, efficiency is not industrially good.

Japanese Official Patent Gazette No. Showa 42-26708 has proposed a process for producing a polyester without using the vacuum apparatus and high power to maintain a high vacuum. The proposed process for producing a polyester comprises performing a copolymerization reaction of an alkylene oxide with a cyclic acid anhydride by using a catalyst system comprising as one component an organic compound of a metal selected from groups I to III in a periodic law table to form a polyester. In Examples 1 to 6 of the Gazette, an alkylene oxide, a cyclic acid anhydride, a solvent and a catalyst are placed and dissolved in a polymerization tube (a tube for polymerization), this tube is sealed, and a copolymerization reaction is performed in the sealed tube at 80° C. (Examples 1 to 4 and 6) or 30° C. (Example 5). An inside pressure of the sealed tube is higher than atmospheric pressure owing to a nitrogen gas and vapor of the solvent. The alkylene oxides used are epichlorohydrin in Examples 1 to 3 and propylene oxide in Examples 4 to 6. The cyclic acid anhydrides used are phthalic anhydride in Examples 1 to 4, endo-cis-bicyclo(2,2,1)-5-heptene-2,3-dicarboxylic anhydride in Example 5, and succinic anhydride in Example 6. The catalysts used are triethylaluminum in Examples 1 to 3 and 6, diethylzinc in Example 4, and diethylzinc and water in Example 6.

Among Examples of the Gazette, Example 6 in which an aliphatic polyester is formed comprises performing a ring-opening copolymerization reaction of propylene oxide with succinic anhydride. However, the polyester formed in this Example 6 is inferior in that its melting point is low since the cyclic ether used is propylene oxide.

If there is performed the ring-opening copolymerization, a reaction of a cyclic acid anhydride containing succinic anhydride as a main component with a cyclic ether containing ethylene oxide as a main component, in the polymerization tube according to the process of the above-mentioned Gazette, there is formed a polymer having a melting point lower than a polymer obtained from a polycondensation reaction of a dicarboxylic acid containing succinic acid as a main component with a glycol containing ethylene glycol as a main component. The reason is as follows. In the polycondensation reaction, dicarboxylic acid molecules and glycol molecules always bond one by one alternately. In contrast, in the ring-opening copolymerization reaction, not only cyclic acid anhydride molecules and cyclic ether molecules bond one by one alternately, but also the cyclic ether molecules bond with each other to form polyether chains.

SUMMARY OF THE INVENTION

It is an object of the present invention to produce with industrially good efficiency a polyester having a high reel ting point and biodegradability by performing a ring-opening copolymerization reaction by using as starting monomers both of a cyclic acid anhydride containing succinic anhydride component and a cyclic ether containing ethylene oxide as a main component.

The present inventors have found that the above-mentioned object can be achieved under the below-mentioned conditions.

That is, the present invention provides a process for producing a polyester, comprising the steps of:
placing a cyclic acid anhydride (hereinafter referred to as "cyclic acid anhydride (A)") containing succinic anhydride as a main component in a reaction vessel, said cyclic acid anhydride (A) being in a melting state or solution state; and
introducing successively a cyclic ether (hereinafter referred to as "cyclic ether (B)") containing ethylene oxide as a main component into said reaction vessel, wherein the rate per hour of introducing said cyclic ether (B) is within the range of 3 to 90 parts by weight per 100 parts by weight of said cyclic acid anhydride (A), and wherein said reaction vessel has an inside pressure within the range of atmospheric pressure to 50 kgf/cm$^2$ as a gauge pressure, whereby a ring-opening copolymerization reaction of said cyclic acid anhydride. (A) with said cyclic ether (B) is carried out to form a polyester.

In this process, the step of placing the cyclic acid anhydride (A) may include placing a polymerization catalyst in the reaction vessel, or the step of introducing successively the cyclic ether (B) may include introducing a polymerization catalyst into the reaction vessel.

In addition, the process of present invention may further comprises a step of introducing at least one chain-elongating agent selected from the group consisting of an oxazoline compound, a phosphoric acid ester, a phosphorous acid ester, a polyvalent metal compound and a polyfunctional acid anhydride into a reaction vessel containing the polyester, whereby a chain-elongating reaction of the polyester is carried out.

The cyclic acid anhydride (A) used in the present invention may have either one or more acid anhydride groups per one molecule, however, a preferable cyclic acid anhydride (A) has one acid anhydride group per one molecule.

The cyclic acid anhydride (A) used in the present invention con rains succinic anhydride as a main component. However, as occasion demands, it is permitted to substitute, for part of succinic anhydride, another cyclic acid anhydride such as maleic anhydride, itaconic anhydride, glutaric anhydride, adipic anhydride, citraconic anhydride, phthalic anhydride, trimellitic anhydride and the like. A content of succinic anhydride in the cyclic acid anhydride (A) is preferably in the range of 50 to 100% by mole, more preferably 80 to 100% by mole. The content of succinic anhydride is less than the range, biodegradability and melting point of a produced polyester tend to be too low.

In addition, a content of a polybasic acid (a ring-opened product from the cyclic acid anhydride) in the cyclic acid anhydride (A) is preferably 2% by weight or less, more preferably 1% by weight or less, still more preferably 0.5% by weight or less. If the content of a polybasic acid in the cyclic acid anhydride (A) is more than the range, a molecular weight of a produced polyester lowers to an undesirable degree.

The cyclic ether (B) used in the present invention contains ethylene oxide as a main component. However, as occasion demands, it is permitted to substitute another cyclic ether for part of ethylene oxide. Examples of the cyclic ether which may be substituted for part of ethylene oxide are propylene oxide, cyclohexene oxide, styrene oxide, epichlorohydrin, allyl glycidyl ether, phenyl glycidyl ether, tetrahydrofuran, oxepane, 1,3-dioxolane and the like. A content of ethylene oxide in the cyclic ether (B) is preferably in the range of 50 to 100% by mole, more preferably 80 to 100% by mole. When the content of ethylene oxide is less than the range, biodegradability and melting point of a produced polyester tend to be too low.

A content of a glycol (a ring-opened product from the cyclic ether) in the cyclic ether (B) is preferably 2% by weight or less, more preferably 1% by weight or less, still more preferably 0.5% by weight or less. If the content of a glycol in the cyclic ether (B) is more than the range, a molecular weight of a produced polyester lowers to an undesirable degree.

A cyclic acid anhydride such as succinic anhydride and the like used in the present invention is thus far known not to homopolymerize. It is significant in the present invention that a polyester, in which acid molecules and alcohol molecules are copolymerized substantially one by one alternately, is obtained in a short period of time by performing a polymerization reaction by successively introducing a cyclic ether into a reaction vessel containing the cyclic acid anhydride which, as mentioned above, does not homopolymerize.

In the present invention, the ring-opening copolymerization reaction can be performed by such a polymerization method as polymerization in a solvent, bulk polymerization and the like. In a case of the polymerization in a solvent, the cyclic acid anhydride (A) is used in a solution state. In a case of the bulk polymerization, the cyclic acid anhydride (A) is used in a melting state.

The polymerization in a solvent may be performed in either a batch manner or continuous manner. Examples of the solvent as used on this occasion are inert solvents such as benzene, toluene, xylene, cyclohexane, n-hexane, dioxane, chloroform, dichloroethane and the like.

The polymerization catalyst used in the present invention is not especially limited and there may be used a catalyst as would usually used in performing a ring-opening polymerization reaction of a polyester. Examples of the polymerization catalyst are metal alkoxides such as triethoxyaluminum, tri-n-propoxyaluminum, tri-iso-propoxyaluminum, tri-n-butoxyaluminum, tri-isobutoxyaluminum, tri-sec-butoxyaluminum, mono-sec-butoxy-di-iso-propoxyaluminum, ethylacetoacetate aluminum diisopropylate, aluminumtris(ethylacetoacetate), tetraethoxytitanium, tetra-iso-propoxytitanium, tetra-n-propoxytitanium, tetra-n-butoxytitanium, tetra-sec-butoxytitanium, tetra-tert-butoxytitanium, tetramethoxyzirconium, tetraethoxyzirconium, tetra-iso-propoxyzirconium, tetra-iso-butoxyzirconium, tetra-n-butoxyzirconium, tri-iso-propoxygallium, tri-iso-propoxyantimony, tri-iso-butoxyantimony, tri-methoxyboron, triethoxyboron, tri-iso-propoxyboron, tri-n-propoxyboron, tri-iso-butoxyboron, tri-n-butoxyboron, tri-sec-butoxyboron, tri-tert-butoxyboron, tetramethoxygermanium, tetraethoxygermanium, tetra-iso-propoxygermanium, tetra-n-propoxygermanium, tetra-iso-butoxygermanium, tetra-n-butoxygermanium, tetra-sec-butoxygermanium, tetra-tertbutoxygermanium and the like; halides such as antimony pentachloride, zinc chloride, lithium bromide, tin(IV) chloride, cadmium chloride, boron trifluoride diethyl ether and the like; alkylaluminum such as trimethylaluminum, triethyaluminum, diethyaluminum chloride, ethylaluminum dichloride, tri-iso-butylaluminum and the like; alkylzinc such as dimethylzinc, diethylzinc, diisopropylzinc and the like; tertiary amines such as triallylamine, triethylamine, tri-n-octylamine, benzyldimethylamine and the like; heteropolyacids such as phosphotungstic acid, phosphomolybdic acid, silicotungstic acid and the like and alkali metal salts thereof. Among these compounds, trialkoxyaluminum compounds are especially preferable. A polyester, in which acid molecules and alcohol molecules are copolymerized substantially one by one alternately, can be formed in a short period of time by introducing the cyclic ether (B) into a reaction vessel containing the cyclic acid anhydride (A) and thereby performing a polymerization reaction in the presence of the trialkoxyaluminum as a polymerization catalyst.

The amount for use of the catalyst is not especially limited, however, it is usually in the range of 0.001 to 10% by weight, preferably 0.01 to 5% by weight, based on a total amount of the cyclic acid anhydride (A) and cyclic ether (B). If the amount of the catalyst is smaller than the range, there is a possibility that a reaction period for the ring-opening copolymerization would be too long. If the amount of the catalyst is larger than the range, there is a possibility that the molecular weight of a produced polyester lowers to an undesirable degree.

The catalyst may be either placed beforehand together with the cyclic acid anhydride (A) in a reaction vessel or introduced successively into a reaction vessel containing the cyclic acid anhydride (A) as in the case of the cyclic ether (B).

A manner of polymerization is not especially limited. However, preferred is a manner where the cyclic acid anhydride (A) and the polymerization catalyst are placed in a defined amount in a reaction vessel and then the cyclic ether (B) is successively introduced into the reaction vessel to perform a polymerization reaction.

A polymerization temperature is not especially limited so far as it is a temperature where the anhydride (A) and ether (B) react with each other. However, the temperature is, for example, in the range of 10° to 250° C., preferably 100° to 250° C., more preferably 100° to 150° C. If the polymerization temperature is lower than the range, there is a possibility that a reaction period for the ring-opening copolymerization would be too long. If the temperature is higher than the range, there is a possibility that the molecular weight of a produced polyester lowers to an undesirable degree, or that coloring of the polyester occurs.

When the ring-opening copolymerization reaction is performed, an inside pressure of a reaction vessel is different according to factors such as reaction temperature (polymerization temperature), the presence or absence of a solvent, and as to the kind of solvent present. However, increase of the amount of an unreacted cyclic ether, accompanied with increase of pressure owing to the successive introduction of the cyclic ether (B), unpreferably increases a polyether content in a reaction product. Accordingly, during the copolymerization reaction, it is necessary that a reaction vessel has an inside pressure within the range of atmospheric pressure to 50 kgf/cm² as a gauge pressure (51 kgf/cm² as an absolute pressure), preferably within the range of atmospheric pressure to 15 kgf/cm² as a gauge pressure. The inside pressure of a reaction vessel may be maintained at a constant value in the above-mentioned range. However, usually, it is preferable that the cyclic ether (B) is so introduced that the inside pressure of a reaction vessel rises in the above-mentioned range accompanied with progress of the successive introduction of the cyclic ether (B). Here, the inside pressure of a reaction vessel is a total of every partial pressure of gases contained in the vessel such as: 1) an inert gas such as a nitrogen gas and the like replaced with an inside atmosphere of the vessel, 2) vapor of a solvent used to dissolve the cyclic acid anhydride, and 3) vapor of a volatilized cyclic ether.

In the present invention, the successive introduction of the cyclic ether (B) into a reaction vessel is so performed that the rate per hour of introducing the cyclic ether (B) is within the range of 3 to 90 parts by weight, preferably 14 to 50 parts by weight, per 100 parts by weight of the cyclic acid anhydride (A). If the successive introduction of the ether (B) is performed in the range, there is formed a polyester in which acid molecules and alcohol molecules are copolymerized substantially one by one alternately. However, a polyether chain may be contained in the polyester to such an extent that lowering of the polyester's melting point does not occur. Such a polyester containing the polyether chain has a biodegradability better than a polyester which has the same or almost the same melting point but which does not contain a polyether chain.

In a case where the rate per hour of introducing the cyclic ether (B) is slower than the lower limit of 3 parts by weight, a reaction period becomes long and productivity becomes poor, which is industrially unpreferable. In addition, in the case where the rate is faster than the upper limit of 90 parts by weight and the case where the whole amount of the ether (B) is placed in a reaction vessel at the initiation of the polymerization reaction all at once, a polyether content in a reaction product increases so that there is obtained only a polyester having a low melting point.

Moreover, the successive introduction of the cyclic ether (B) means not introducing the ether (B) all at once and may be either continuous dropwise introduction or intermittent introduction separating the process into multiple steps. It is preferable to perform continuous introduction in such a manner that the introducing amount does not vary much with time.

In the present invention, a reaction ratio by mole between the anhydride (A) and ether (B), (A)/(B), is preferably in the range of 40/60 to 60/40. The ratio is more preferably in the range of 40/60 to 49/51 in order that the ether (B) be in excess of the anhydride (A), since the physical properties of the polyester are lowered by a residual cyclic acid anhydride and a terminal carboxylic group of the polyester. If the ratio is in this range, a content of the terminal carboxylic group is less than 50% of all terminal groups of the polyester, so that heat resistance is improved. If the ratio deviates from this range, the amount of an unreacted monomer increases, so that a yield of a polyester may lower. In the present invention, it is preferable to successively introduce the ether (B) in a defined amount determined from considering the above-mentioned reaction ratio by mole and then perform an ageing reaction by continuing a polymerization reaction at the aforementioned reaction temperature. After completion of the ageing reaction, a formed polyester may be separated from a polymerization system. The obtained polyester may be effectively applied to various uses by processing the polyester with molding.

Besides superior mechanical property, heat resistance is sometimes demanded of a high-molecular polyester. Since this heat resistance much depends upon a content of a terminal carboxylic group in the polyester, a polyester of low carboxylic group equivalent is desired.

The polyester obtained by the step of ring-opening copolymerization of the present invention may be further subjected to a reaction with at least one chain-elongating agent selected from the group consisting of an oxazoline compound, a phosphoric acid ester, a phosphorous acid ester, a polyvalent metal compound and a polyfunctional acid anhydride, whereby chain-elongating of the polyester can be performed. Owing to this chain-elongating; film-forming capability, heat resistance, mechanical strength or the like of the polyester is improved and coloring does not occur.

A process for a reaction between the polyester and the oxazoline compound is not especially limited. However, examples of this are a process comprising reacting the polyester with the oxazoline compound under conditions where the polyester is dissolved in a proper solvent, a process comprising reacting the polyester with the oxazoline compound under conditions where the polyester is melted with heating, and the like.

Examples of the oxazoline compound used i n the present invention are 2-oxazoline, 2-methyl-2-oxazoline, 2-ethyl-2-oxazoline, 2-isopropyl-2-oxazoline, 2-butyl-2-oxazoline, 2-phenyl-2-oxazoline, 2,2'-bis(2-oxazoline), 2,2'-methylene-bis(2-oxazoline), 2,2'-ethylene-bis(2-oxazoline) 2,2'-trimethylene-bis(2-oxazoline), 2,2'-tetramethylene-bis(2-oxazoline), 2,2'-hexamethylene-bis(2-oxazoline), 2,2'-octamethylene-bis(2-oxazoline), 2,2'-ethylene-bis(4,4'-dimethyl-2-oxazoline), 2,2'-p-phenylene-bis(2-oxazoline), 2,2'-m-phenylene-bis(2-oxazoline), 2,2'-m-phenylene-bis(4,4'-dimethyl-2-oxazoline), bis(2-oxazolinylcyclohexane) sulfide, bis(2-oxazolinylnorbornane) sulfide and the like. From among these compounds, one or more kinds can be used. Preferred is at least one of 2,2'-m-phenylene-bis(2-oxazoline) and bis(2-oxazolinylnorbornane) sulfide.

The amount for use of the oxazoline compound (reaction ratio of the oxazoline compound) is preferably in the range of 0.001 to 10% by weight, more preferably 0.01 to 5% by weight, based on the polyester.

A temperature for a reaction between the polyester and oxazoline compound is preferably in the range of 20° to 250° C., more preferably 100° to 200° C.

In a case where the reaction ratio of the oxazoline compound to the polyester is less than the lower limit of 0.001% by weight, the polyester is not converted in to one of sufficiently high-molecularity. In addition, in a case where the reaction ratio is more than the upper limit of 10% by weight, the amount of an unreacted oxazoline compound becomes large, which is economically disadvantageous.

Moreover, in order to accelerate the reaction between the polyester and oxazoline compound, as occasion demands, there may freely be used a conventional catalyst such as an amine salt of an acidic compound and the like.

A process for a reaction between the polyester and the phosphoric acid ester or phosphorous acid ester is not especially limited. However, preferred is a process comprising reacting the polyester with the phosphoric acid ester or phosphorous acid ester under a reduced pressure and conditions where the polyester is melted with heating.

The phosphoric acid ester and phosphorous acid ester used in the present invention may be either a diester or triester. Examples of an ester group are methyl, ethyl, propyl, butyl, phenyl, 2-ethylhexyl and the like. However, taking reactivity and cost performance into consideration, methylethyl and phenyl are preferable. From among them, one or more kinds may be used.

The amount for use of the phosphoric acid ester or phosphorous acid ester (reaction ratio of the phosphoric acid ester or phosphorous acid ester) is preferably in the range of 0.001 to 10% by weight, more preferably 0.01 to 5% by weight, based on the polyester.

In a case where the reaction ratio of the phosphoric acid ester or phosphorous acid ester to the polyester is less than the lower limit of 0.001% by weight, the polyester is not converted into one of sufficiently high-molecularity. In addition, in a case where the reaction ratio is more than the upper limit of 10% by weight, the amount of an unreacted phosphoric acid ester or phosphorous acid ester becomes large, which is economically disadvantageous.

A temperature for a reaction between the polyester and the phosphoric acid ester or phosphorous acid ester is preferably in the range of 20° to 250° C., more preferably 100° to 200 ° C.

Examples of the polyvalent metal compound used in the present invention are organometallic compounds, metal salts, metal alkoxides and the like of which metal valence is 2 or more, Preferable metals in the organometallic compounds and metal salts, of which metal valence is 2 or more, are zinc, calcium, copper, iron, magnesium, cobalt, barium and the like. More preferable organometallic compounds and metal salts are zinc(II) acetylacetonate, zinc acetate, zinc formate, zinc propionate, zinc carbonate and the like in which counter anions of the polyvalent metal compounds can be separated and recovered as volatile components from a reaction system after neutralization.

Examples of the metal-alkoxide are aluminum isopropoxide, mono-sec-butoxyaluminum diisopropylate, aluminum ethylate, tetraisopropoxytitanium, tetra-n-butoxytitanium, tetra(2-ethylhexyloxy)titanium, tetrastearyloxytitanium, tetra-n-butoxyzirconium, tri-iso-propoxygallium, tri-iso-propoxyantimony, trimethoxyboron, tetramethoxygermanium and the like.

A process for a reaction between the polyester and the polyvalent metal compound is not especially limited. However, examples of this process are a process comprising reacting the polyester with the polyvalent metal compound under conditions where the polyester is dissolved in a proper solvent, a process comprising reacting the polyester with the polyvalent metal compound under conditions where the polyester is melted with heating, and the like.

A reaction ratio between the polyester and the polyvalent metal compound is not especially limited. In a case of a neutralization reaction between a carboxyl group at a terminal end of the polyester and the polyvalent organometallic compound or metal salt, for example, a ratio of the metal compound to all carboxyl groups of the polyester (metal compound/COOH (ratio by mole)) is preferably in the range of 0.1 to 2.0, more preferably 0.2 to 1.2.

In a case of a reaction between a hydroxyl group at a terminal end of the polyester and the metal alkoxide, for example, a ratio of the metal compound to all hydroxyl groups of the polyester (metal compound/OH (ratio by mole)) is preferably in the range of 0.1 to 2.0, more preferably 0.2 to 1.2.

The polyfunctional acid anhydride used in the present invention means a compound having two or more acid anhydride groups per one molecule, and examples thereof are pyromellitic dianhydride; 1,2,3,4-butanetetracarboxylic dianhydride; ethylene glycol bis(anhydrotrimellitate); 3,3',4,4'-diphenylsulfonetetracarboxylic dianhydride; 3,4-dicarboxy-1,2,3,4- tetrahydro-1-naphthalenesuccinic dianhydride; 3,3',4,4'-benzophenonetetracarboxylic dianhydride; homopolymers of maleic anhydride; copolymers of maleic anhydride with vinyl acetate, ethylene, isobutylene, isobutyl vinyl ether, acrylonitrile or styrene; and the like. In view of reactivity and cost performance, pyromellitic dianhydride and 1,2,3,4-butanetetracarboxylic dianhydride are preferred. There may be used one or two or more kinds of the above-mentioned compounds.

A reaction ratio between the polyester and the polyfunctional acid anhydride is not especially limited. However, in a case of a reaction between a hydroxyl group at a terminal end of the polyester and the polyfunctional acid anhydride, for example, a ratio of all acid anhydride groups of the polyfunctional acid anhydride to all hydroxyl groups of the polyester (acid anhydride group/OH (ratio by mole)) is preferably in the range of 0.1 to 5.0, more preferably 0.2 to 2.0.

A polyester obtained by the above-mentioned chain-elongating can be effectively applied to various uses by processing the polyester with molding.

Preferred embodiments of the process of present invention for producing a polyester are as follows.

Only succinic acid is used as the cyclic acid anhydride (A), and only ethylene oxide is used as the cyclic ether (B).

Only a metal alkoxide compound is used as the polymerization catalyst.

Only succinic acid is used as the cyclic acid anhydride (A), only ethylene oxide is used as the cyclic ether (B), and only a metal alkoxide compound is used as the polymerization catalyst.

In a case of using a metal alkoxide compound as the polymerization catalyst, the metal alkoxide compound is at least one member selected from the group consisting of trialkoxyaluminum compounds, tetraalkoxytitanium compounds, tetraalkoxyzirconium compounds and dialkoxyzinc compounds. A preferable one is at least one member selected from the group consisting of trialkoxyaluminum compounds.

The cyclic ether (B) is successively introduced into a reaction vessel in total within the range of 60/40 to 40/60 in ratio by mole based on the cyclic acid anhydride (A). In the most preferable case, ethylene oxide is successively introduced into a reaction vessel in total within the range of 60/40 to 40/60 in ratio by mole based on succinic anhydride.

The amount of the polymerization catalyst is in the range of 0.001 to 10% by weight based on a total amount of the cyclic acid anhydride (A) and cyclic ether (B).

In a case of performing the step of chain-elongating the polyester, there is used at least one of the following chain-elongating agents ① to ④.

① At least one member selected from the group consisting of an oxazoline compound, a phosphoric acid ester and a phosphorous acid ester is used in a ratio of 0.001 to 10% by weight based on the polyester which is formed by the ring-opening copolymerization reaction.

② The polyvalent metal compound is at least one member selected from the group consisting of organic compounds of a metal having a valence of 2 or more and salts of a metal having a valence of 2 or more, and is used in a ratio by mole of 0.1 to 2.0 based on all carboxyl groups of the polyester which is formed by the ring-opening copolymerization reaction.

③ The polyvalent metal compound is at least one member selected from the group consisting of alkoxides of a metal having a valence of 2 or more, and is used in a ratio by mole of 0.1 to 2.0 based on all hydroxyl groups of the polyester which is formed by the ring-opening copolymerization reaction.

④ The polyfunctional acid anhydride is at least one member selected from the group consisting of pyromellitic dianhydride and 1,2,3,4-butanetetracarboxylic dianhydride, and is used in a ratio by mole of 0.1 to 2.0 of acid anhydride groups of the polyfunctional acid anhydride based on all hydroxyl-groups of the polyester which is formed by the ring-opening copolymerization reaction.

According to the present invention, there can be synthesized a polyester having biodegradability in a short reaction period and a high yield. The polyester obtained by the present invention has a relatively high molecular weight, contains almost no polyether component in the structure and has a high melting point. Therefore this polyester can be readily processed with molding into a film, a sheet and the like and the resulting molded article is superior in durability. Accordingly, the polyester obtained by the present invention can be effectively used for disposable packing materials, miscellaneous goods for daily use, and the like.

DESCRIPTION OF THE PREFERRED EMBODIMENTS

Hereinafter, this invention is illustrated by the following examples of some preferred embodiments in comparison with comparative examples not according to the invention. However, this invention is not limited to the undermentioned examples. Furthermore, in the examples and comparative examples, the unit "part(s)" denotes "part(s) by weight".

Evaluation methods performed in the examples and comparative examples are as follows. Results were collectively shown in TABLES 1 to 4.

Molecular Weight

The number-average molecular weight calculated as standard polystyrene was measured by using gel permeation chromatography (GPC).

Melting Point

The melting point was measured by differential scanning calorimetry (DSC).

Tensile Test

A film of 200 μ thickness was made by a compression molding machine under conditions of 130° C., 150 kg/cm² and 2 minutes to perform a tensile test at a test speed of 20 ram/rain according to JIS K7121.

Biodegradability

A film of 200 μ thickness was made by a compression molding machine under conditions of 130° C., 150 kg/cm² and 2 minutes, the resulting film was buried into a planter in which soil was placed. The planter was preserved in a thermohumidistat of 23° C. and relative humidity 65% while water was sprinkled on the planter once a day. After 100 days, a change of outside appearance of the film was observed.

Here, as the soil, there was used a mixture of soil as sampled in Onohara, Minoo-shi, Japan, soil as sampled in Otabi-cho, Suita-shi, Japan, and leaf mold in a ratio of 3:1:3.

Results were described as follows.

(+): change of outside appearance was recognized.
(-): change of outside appearance was not recognized.

EXAMPLE 1

To an autoclave were added 250.0 parts of succinic anhydride, 250.0 parts of toluene and 4.20 parts of aluminum isopropoxide. An inside atmosphere of the autoclave was replaced by a nitrogen gas. Then, a temperature of the autoclave was gradually elevated to 115° C. with stirring to dissolve the succinic anhydride. While maintaining an inside pressure of the autoclave in a range of 0.6 to 1.5 kgf/cm² as a gauge pressure at 115° C., 110 parts of ethylene oxide was continuously introduced into the autoclave for 2.5 hours at the rate of 44 parts an hour. After completion of the introduction of ethylene oxide, an ageing reaction was performed at 115° C. for 40 minutes and then a temperature of a system was reverted to normal temperature. Toluene was removed by evaporation to separate a polymerized product.

The resulting polymerized product was dried under a reduced pressure and then a procedure, wherein the polymerized product was dissolved in chloroform and precipitated in tetrahydrofuran for purification, was thrice repeated to obtain a polyester (1). A yield of this polyester (1) was determined, so that it was 96.2%. In addition, the number-average molecular weight measured by the GPC was 13,100 and the melting point measured by the DSC was 97.8° C.

EXAMPLE 2

To an autoclave were added 386.2 parts of succinic anhydride and 2.32 parts of aluminum isopropoxide. An inside atmosphere of the autoclave was sufficiently replaced by a nitrogen gas. A temperature of the autoclave was gradually elevated to 126° C. to melt the succinic anhydride. Then, while maintaining an inside pressure of the autoclave in a range of 0.3 to 6.5 kgf/cm² as a gauge pressure at 126° C., 170 parts of ethylene oxide was introduced into the autoclave at a reaction temperature of 126° C. for 2 hours at the rate of 85 parts an hour. After completion of the introduction of ethylene oxide, an ageing reaction was performed at 126° C. for 90 minutes and then a temperature of a system was reverted to normal temperature, whereby a polymerized product was obtained.

The resulting polymerized product was purified in a manner similar to EXAMPLE 1 to obtain a polyester (2). A yield of this polyester (2) was determined, so that it was 91.5%. In addition, the number-average molecular weight measured by the GPC was 19,500 and the melting point measured by the DSC was 100.2° C.

EXAMPLE 3

To an autoclave were added 507.5 parts of succinic anhydride and 2.74 parts of aluminum isopropoxide. An inside atmosphere of the autoclave was replaced by a nitrogen gas. Then, a temperature of the autoclave was gradually elevated to 135° C. with stirring to melt the succinic anhydride. While maintaining an inside pressure of the autoclave in a range of 3 to 12.6 kgf/cm² as a gauge pressure at 135° C., 270.2 parts of ethylene oxide was continuously introduced into the autoclave for 9.0 hours at the rate of 30 parts an hour. After completion of the introduction of ethylene oxide, an ageing reaction was performed at 135° C. for 1.0 hours and then a temperature of a system was reverted to normal temperature, whereby a polymerized product was obtained.

A procedure, wherein the resulting polymerized product was dissolved in chloroform and precipitated in tetrahydrofuran for purification, was thrice repeated to obtain a polyester (3). A yield of this polyester (3) was determined, so that it was 99.0%. In addition, the number-average molecular weight measured by the GPC was 17,000 and the melting point measured by the DSC was 105.1° C. A content of a carboxyl group in the polyester was determined by neutralization titration, so that it was 0.0150 mmol/g. These results from measurement show that a ratio of the carboxyl group to terminal ends of the polyester is 12.8%.

EXAMPLE 4

To an autoclave were added 505.3 parts of succinic anhydride and 2.83 parts of zinc n-butoxide. An inside atmosphere of the autoclave was replaced by a nitrogen gas. Then, a temperature of the autoclave was gradually elevated to 135° C. with stirring to melt the succinic anhydride. While maintaining an inside pressure of the autoclave in a range of 3 to 8.1 kgf/cm² as a gauge pressure at 135° C., 244.6 parts of ethylene oxide was continuously introduced into the autoclave for 5.0 hours at the rate of 49 parts an hour. After completion of the introduction of ethyleneoxide, an ageing reaction was performed at 135° C. for 3.0 hours and then a temperature of a system was reverted to normal temperature, whereby a polymerized product was obtained.

A procedure, wherein the resulting polymerized product was dissolved in chloroform and precipitated in tetrahydrofuran for purification, was thrice repeated to obtain a polyester (4). A yield of this polyester (4) was determined, so that it was 98.6%. In addition, the number-average molecular weight measured by the GPC was 11,600 and the melting point measured by the DSC was 91.7° C.

EXAMPLE 5

To an autoclave were added 504.6 parts of succinic anhydride and 3.67 parts of ethylacetoacetate aluminum diisopropylate. An inside atmosphere of the autoclave was replaced by a nitrogen gas. Then, a temperature of the autoclave was gradually elevated to 135° C. with stirring to melt the succinic anhydride. While maintaining an inside pressure of the autoclave in a range of 4.0 to 10.1 kgf/cm² as a gauge pressure at 135° C., 244.3 parts of ethylene oxide was continuously introduced into the autoclave for 4.5 hours at the rate of 54 parts an hour. After completion of the introduction of ethylene oxide, an ageing reaction was performed at 135° C. for 2.0 hours and then a temperature of a system was reverted to normal temperature, whereby a polymerized product was obtained.

A procedure, wherein the resulting polymerized product was dissolved in chloroform and precipitated in tetrahydrofuran for purification, was thrice repeated to obtain a polyester (5). A yield of this polyester (5) was determined, so that it was 98.6%. In addition, the number-average molecular weight measured by the GPC was 24,000 and the melting point measured by the DSC was 97.7° C.

EXAMPLE 6

To an autoclave were added 508.2 parts of succinic anhydride and 3.82 parts of titanium tetraisopropoxide. An inside atmosphere of the autoclave was replaced by a nitrogen gas. Then, a temperature of the autoclave was gradually elevated to 130° C. with stirring to melt the succinic anhydride. While maintaining an inside pressure of the autoclave in a range of 0 to 7.2 kgf/cm² as a gauge pressure at 130° C., 270.6 parts of ethylene oxide was continuously introduced into the autoclave for 3.25 hours at the rate of 83 parts an hour. After completion of the introduction of ethylene oxide, an ageing reaction was performed at 130° C. for 2.0 hours and then a temperature of a system was reverted to normal temperature, whereby a polymerized product was obtained.

A procedure, wherein the resulting polymerized product was dissolved chloroform and precipitated in tetrahydrofuran for purification, was thrice repeated to obtain a polyester (6). A yield of this polyester (6) was determined, so that it was 92.1%. In addition, the number-average molecular weight measured by the GPC was 13,000 and the melting point measured by the DSC was 90.0° C. A content of a carboxyl group in the polyester was determined by neutralization titration, so that it was 0.0320 mmol/g. These results from measurement show that a ratio of the carboxyl group to terminal ends of the polyester is 20.8%.

EXAMPLE 7

To an autoclave were added 386.2 parts of succinic anhydride and 2.09 parts of aluminum isopropoxide. An inside atmosphere of the autoclave was replaced by a nitrogen gas. Then, a temperature of the autoclave was gradually elevated to 130° C. with stirring to melt the succinic anhydride. While maintaining an inside pressure of the autoclave in a range of 0 to 7.0 kgf/cm² as a gauge pressure at 130° C., 187.0 parts of ethylene oxide was continuously introduced into the autoclave for 2.5 hours at the rate of 75 parts an hour. After completion of the introduction of ethylene oxide, an ageing reaction was performed at 130° C. for 2.0 hours and then a temperature of a system was reverted to normal temperature, whereby a polymerized product was obtained.

A procedure, wherein the resulting polymerized product was dissolved in chloroform and precipitated in tetrahydrofuran for purification, was thrice repeated to obtain a polyester (7). A yield of this polyester (7) was determined, so that it was 98.2%. In addition, the number-average molecular weight measured by the GPC was 20,500 and the melting point measured by the DSC was 97.5° C. A content of a carboxyl group in the polyester was determined by neutralization titration, so that it was 0.0434 mmol/g. These results from measurement show that a ratio of the carboxyl group to terminal ends of the polyester is 44.5%.

The polymerized product, 100.0 parts, was heated with stirring in a nitrogen gas current, 2.30 parts of 2,2'-m-phenylene-bis(2-oxazoline) was added at 190° C., and a reaction was performed for 4.5 hours, whereby a high-molecular polyester (1) was obtained. For this polyester, the number-average molecular weight measured by the GPC was 31,000 and the melting point measured by the DSC was 98.8° C. In addition, a film of 200 $\mu$ thickness was made from the polyester by a compression molding machine under conditions of 130° C., 150 kg/cm$^2$ and 2 minutes to measure tensile strength and elongation of the film. As a result, the tensile strength was 185 kg/cm$^2$ and the elongation was 420%.

In addition, to examine heat resistance, the high-molecular polyester (1) was heated with stirring in a nitrogen gas current at 190° C. for 2 hours and then the GPC measurement was performed, so that a change in the number-average molecular weight was not recognized.

EXAMPLE 8

To an autoclave were added 375.9 parts of succinic anhydride and 3.06 parts of aluminum isopropoxide. An inside atmosphere of the autoclave was replaced by a nitrogen gas. Then, a temperature of the autoclave was gradually elevated to 130° C. with stirring to melt the succinic anhydride. While maintaining an inside pressure of the autoclave in a range of 0 to 10.2 kgf/cm$^2$ as a gauge pressure at 130° C., 192.1 parts of ethylene oxide was continuously introduced into the autoclave for 2.0 hours at the rate of 96 parts an hour. After completion of the introduction of ethylene oxide, an ageing reaction was performed at 130° C. for 0.2 hours and then a temperature of a system was reverted to normal temperature, whereby a polymerized product was obtained.

A procedure, wherein the resulting polymerized product was dissolved in chloroform and precipitated in tetrahydrofuran for purification, was thrice repeated to obtain a polyester (8). A yield of this polyester (8) was determined, so that it was 99.1%. In addition, the number-average molecular weight measured by the GPC was 18,000 and the melting point measured by the DSC was 95.9° C. A content of a carboxyl group in the polyester was determined by neutralization titration, so that it was 0.0401 mmol/g. These results from measurement show that a ratio of the carboxyl group to terminal ends of the polyester is 36.1%.

The polymerized product, 100.0 parts, was heated with stirring in a nitrogen gas current, 2.10 parts of 2,2'-m-phenylene-bis(2-oxazoline) was added at 190° C., and a reaction was performed for 4.5 hours, whereby a high-molecular polyester (2) was obtained. For this polyester, the number-average molecular weight measured by the GPC was 33,000 and the melting point measured by the DSC was 96.8° C. In addition, a film of 200 $\mu$ thickness was made from the polyester by a compression molding machine under conditions of 130° C., 150 kg/cm$^2$ and 2 minutes to measure tensile strength and elongation of the film. As a result, the tensile strength was 195 kg/cm$^2$ and the elongation was 450%.

In addition, to examine heat resistance, the high-molecular polyester (2) was heated with stirring in a nitrogen gas current at 190° C. for 2 hours and then the GPC measurement was performed, so that a change in the number-average molecular weight was not recognized.

EXAMPLE 9

The procedure of EXAMPLE 7 was repeated except that 2.30 parts of 2,2'-m-phenylene-bis(2-oxazoline) was changed to 7.23 parts of bis(2-oxazolinylnorbornane) sulfide and that a reaction period of 4.5 hours was changed to 1.0 hours, whereby a high-molecular polyester (3) was obtained. For this polyester, the number-average molecular weight measured by the GPC was 35,000 and the melting point measured by the DSC was 96.5° C. In addition, a film of 200 $\mu$ thickness was made from the polyester by a compression molding machine under conditions of 130° C., 150 kg/cm$^2$ and 2 minutes to measure tensile strength and elongation of the film. As a result, the tensile strength was 189 kg/cm$^2$ and the elongation was 380%.

In addition, to examine heat resistance, the high-molecular polyester (3) was heated with stirring in a nitrogen gas current at 190° C. for 2 hours and then the GPC measurement was performed, so that a change i n the number-average molecular weight was not recognized.

EXAMPLE 10

The procedure of EXAMPLE 8 was repeated except that 2.10 parts of 2,2'-m-phenylene-bis(2-oxazoline) was changed to 7.10 parts of bis(2-oxazolinylnorbornane) sulfide and that a reaction period of 4.5 hours was changed to 1.0 hours, whereby a high-molecular polyester (4) was obtained. For this polyester, the number-average molecular weight measured by the GPC was 38,000 and the melting point measured by the DSC was 96.1° C. In addition, a film of 200 $\mu$ thickness was made from the polyester by a compression molding machine under conditions of 130° C., 150 kg/cm$^2$ and 2 minutes to measure tensile strength and elongation of the film. As a result, the tensile strength was 210 kg/cm$^2$ and the elongation was 430%.

In addition, to examine heat resistance, the high-molecular polyester (4) was heated with stirring in a nitrogen gas current at 190° C. for 2 hours and then the GPC measurement was performed, so that a change in the number-average molecular weight was not recognized.

EXAMPLE 11

The polymerized product, 100.0 parts, obtained in EXAMPLE 6, was heated with stirring in a nitrogen gas current, 2.66 parts of 2,2'-m-phenylene-bis(2-oxazoline) was added at 190° C., and a reaction was performed for 4.5 hours, whereby a high-molecular polyester (5) was obtained. For this polyester, the number-average molecular weight measured by the GPC was 27,000 and the melting point measured by the DSC was 90.8° C. In addition, a film of 200 $\mu$ thickness was made from the polyester by a compression molding machine under conditions of 130° C., 150 kg/cm² and 2 minutes to measure tensile strength and elongation of the film. As a result, the tensile strength was 115 kg/cm² and the elongation was 360%.

In addition, to examine heat resistance, the high-molecular polyester (5) was heated with stirring in a nitrogen gas current at 190° C. for 2 hours and then the GPC measurement was performed, so that a change in the number-average molecular weight was not recognized.

EXAMPLE 12

The procedure of EXAMPLE 7 was repeated except that the amount for use of 2,2'-m-phenylene-bis(2-oxazoline) was changed to 0.29 parts, whereby a high-molecular polyester (6) was obtained. For this polyester, the number-average molecular weight measured by the GPC was 26,000 and the melting point measured by the DSC was 97.2° C. In addition, a film of 200 μ thickness was made from the polyester by a compression molding machine under conditions of 130° C., 150 kg/cm² and 2 minutes to measure tensile strength and elongation of the film. As a result, the tensile strength was 100 kg/cm² and the elongation was 280%.

In addition, to examine heat resistance, the high-molecular polyester (6) was heated with stirring in a nitrogen gas current at 190° C. for 2 hours and then the GPC measurement was performed, so that a change in the number-average molecular weight was not recognized.

EXAMPLE 13

A reaction of 70.0 parts of the high-molecular polyester (1), obtained in EXAMPLE 7, with 0.795 parts of diphenyl phosphite was performed in a nitrogen gas current for 3.0 hours under conditions of a reduced pressure 1.8–3.7 mmHg, 100 rpm and jacket temperature 190° C. by a self-cleaning type twin screw mixer (S1 KRC reactor made by Kurimoto Tekkosho Co., Ltd., inner diameter 25 mm, L/D=10.2) to obtain a high-molecular polyester (7). For this polyester, the number-average molecular weight measured by the GPC was 42,000 and the melting point measured by the DSC was 99.8° C. In addition, a film of 200 μ thickness was made from the polyester by a compression molding machine under conditions of 130° C., 150 kg/cm² and 2 minutes to measure tensile strength and elongation of the film. As a result, the tensile strength was 210 kg/cm² and the elongation was 490%.

EXAMPLE 14

A reaction of 70.0 parts of the high-molecular polyester (2), obtained in EXAMPLE 8, with 0.810 parts of diphenyl phosphite was performed in a nitrogen gas current for 3.0 hours under conditions of a reduced pressure 1.7–3.5 mmHg, 100 rpm and jacket temperature 190° C. by a self-cleaning type twin screw mixer (S1 KRC reactor made by Kurimoto Tekkosho Co., Ltd., inner diameter 25 mm, L/D=10.2) to obtain a high-molecular polyester (8). For this polyester, the number-average molecular weight measured by the GPC was 36,000 and the melting point measured by the DSC was 98.2° C. In addition, a film of 200 μ thickness was made from the polyester by a compression molding machine under conditions of 130° C., 150 kg/cm² and 2 minutes to measure tensile strength and elongation of the film. As a result, the tensile strength was 200 kg/cm² and the elongation was 480%.

EXAMPLE 15

The procedure of EXAMPLE 13 was repeated except that 2.30 parts of 2,2'-m-phenylene-bis(2-oxazoline) was changed to 7.23 parts of bis(2-oxazolinylnorbornane) sulfide and that a reaction period of 4.5 hours was changed to 1.0 hours, whereby a high-molecular polyester (9) was obtained. For this polyester, the number-average molecular weight measured by the GPC was 39,000 and the melting point measured by the DSC was 97.5° C. In addition, a film of 200 μ thickness was made from the polyester by a compression molding machine under conditions of 130° C., 150 kg/cm² and 2 minutes to measure tensile strength and elongation of the film. As a result, the tensile strength was 195 kg/cm² elongation was 420%.

EXAMPLE 16

A reaction of 70.0 parts of the polyester (3), obtained in EXAMPLE 3, with 0.950 parts of diphenyl phosphite was performed in a nitrogen gas current for 3.0 hours under conditions of a reduced pressure 1.7–3.5 mmHg, 100 rpm and jacket temperature 190° C. by a self-cleaning type twin screw mixer (S1 KRC reactor made by Kurimoto Tekkosho Co., Ltd., inner diameter 25 mm, L/D=10.2) to obtain a high-molecular polyester (10). For this polyester, the number-average molecular weight measured by the GPC was 46,000 and the melting point measured by the DSC was 104.8° C. In addition, a film of 200 μ thickness was made from the polyester by a compression molding machine under conditions of 130° C., 150 kg/cm² and 2 minutes to measure tensile strength and elongation of the film. As a result, the tensile strength was 220 kg/cm² and the elongation was 510%.

EXAMPLE 17

A reaction of 70.0 parts of the high-molecular polyester (5), obtained in EXAMPLE 11, with 0.950 parts of diphenyl phosphite was performed in a nitrogen gas current for 3.0 hours under conditions of a reduced pressure 1.1–3.9 mmHg, 100 rpm and jacket temperature 190° C. by a self-cleaning type twin screw mixer (S1 KRC reactor made by Kurimoto Tekkosho Co., Ltd., inner diameter 25 mm, L/D=10.2) to obtain a high-molecular polyester (11). For this polyester, the number-average molecular weight measured by the GPC was 32,000 and the melting point measured by the DSC was 90.2° C. In addition, a film of 200 μ thickness was made from the polyester by a compression molding machine under conditions of 130° C., 150 kg/cm² and 2 minutes to measure tensile strength and elongation of the film. As a result, the tensile strength was 180 kg/cm² and the elongation was 400%.

EXAMPLE 18

The procedure of EXAMPLE 13 was repeated except that 0.795 parts of diphenyl phosphite was changed to 3.20 parts of triphenyl phosphite, whereby a high-molecular polyester (12) was obtained. For this polyester, the number-average molecular weight measured by the GPC was 40,500 and the melting point measured by the DSC was 98.8° C. In addition, a film of 200 μ thickness was made from the polyester by a compression molding machine under conditions of 130° C., 150 kg/cm² and 2 minutes to measure tensile strength and elongation of the film. As a result, the tensile strength was 215 kg/cm$^2$ and the elongation was 400

EXAMPLE 19

The procedure of EXAMPLE 13 was repeated except that 0.795 parts of diphenyl phosphite was changed to 3.20 parts of triphenyl phosphate, whereby a high-molecular polyester (13) was obtained. For this polyester, the number-average molecular weight measured by the GPC was 41,500 and the melting point measured by the DSC was 97.1° C. In addition, a film of 200 μ thickness was made from the polyester by a compression molding machine under conditions of 130° C., 150 kg/cm$^2$ and 2 minutes to measure tensile strength and elongation of the film. As a result, the tensile strength was 200 kg/cm$^2$ and the elongation was 395%.

EXAMPLE 20

The procedure of EXAMPLE 13 was repeated except that 0.795 parts of diphenyl phosphite was changed to 0.468 parts of diethyl phosphite, whereby a high-molecular polyester (14) was obtained. For this polyester, the number-average molecular weight measured by the GPC was 30,000 and the melting point measured by the DSC was 96.8° C. In addition, a film of 200 μ thickness was made from the polyester by a compression molding machine under conditions of 130° C., 150 kg/cm$^2$ and 2 minutes to measure tensile strength and elongation of the film. As a result, the tensile strength was 175 kg/cm$^2$ and the elongation was 370%.

EXAMPLE 21

The polyester (7), 62.71 parts, obtained in EXAMPLE 7, was heated with stirring in a nitrogen gas current, 1.79 parts of zinc(II) acetylacetonate was added at 170° C., an inside pressure of a system was maintained in a range of 5 to 10 mmHg, and a reaction was performed for 12 hours to obtain a high-molecular polyester (15). For this polyester, the number-average molecular weight measured by the GPC was 31,000 and the melting point measured by the DSC was 97.8° C. In addition, a film of 200 μ thickness was made from the polyester by a compression molding machine under conditions of 130° C., 150 kg/cm$^2$ and 2 minutes to measure tensile strength and elongation of the film. As a result, the tensile strength was 165 kg/cm$^2$ and the elongation was 320%.

EXAMPLE 22

To an autoclave were added 386.2 parts of succinic anhydride and 1.67 parts of aluminum isopropoxide as a polymerization catalyst. An inside atmosphere of the autoclave was replaced by a nitrogen gas. Then, a temperature of the autoclave was gradually elevated to 130° C. with stirring to melt the succinic anhydride. While maintaining an inside pressure of the autoclave in a range of 0 to 9.8 kgf/cm$^2$ as a gauge pressure at 130° C., 204.0 parts of ethylene oxide was continuously introduced for 1 hour. After completion of the introduction of ethylene oxide, an ageing reaction was performed at 130° C. for 1.0 hour and then a temperature of a system was reverted to normal temperature, whereby a polymerized product was obtained.

The resulting polymerized product was purified in a manner similar to EXAMPLE 1 to obtain a polyester (9). A yield of this polyester (9) was determined, so that it was 98.3%. In addition, the number-average molecular weight measured by the GPC was 22,500 and the melting point measured by the DSC was 97.8° C.

The obtained polyester (9), 69.6 parts, was heated with stirring in a nitrogen gas current, 1.29 parts of zinc(II) acetylacetonate was added at 170° C., an inside pressure of a system was maintained in a range of 5 to 10 mmHg, and a reaction was performed for 11 hours to obtain a high-molecular polyester (16). For this polyester, the number-average molecular weight measured by the GPC was 29,000 and the melting point measured by the DSC was 97.9° C. In addition, a film of 200 μ thickness was made from the polyester by a compression molding machine under conditions of 130° C., 150 kg/cm$^2$ and 2 minutes to measure tensile strength and elongation of the film. As a result, the tensile strength was 150 kg/cm$^2$ and the elongation was 310%.

EXAMPLE 23

A reaction of 70.0 parts of the high-molecular polyester (1), obtained in EXAMPLE 7, with 0.832 parts of titanium tetraisopropoxide was performed in a nitrogen gas current for 3.3 hours under conditions of a reduced pressure 1.0–3.0 mmHg, 100 rpm and jacket temperature 190° C. by a self-cleaning type twin screw mixer (S1 KRC reactor made by Kurimoto Tekkosho Co., Ltd., inner diameter 25 mm, L/D=10.2) to obtain a high-molecular polyester (17). For this polyester, the number-average molecular weight measured by the GPC was 34,100 and the melting point measured by the DSC was 97.8° C. In addition, a film of 200 μ thickness was made from the polyester by a compression molding machine under conditions of 130° C., 150 kg/cm$^2$ and 2 minutes to measure tensile strength and elongation of the film. As a result, the tensile strength was 265 kg/cm$^2$ and the elongation was 430%.

EXAMPLE 24

A reaction of 70.0 parts of the high-molecular polyester (1), obtained in EXAMPLE 7, with 0.935 parts of zinc stearate was performed in a nitrogen gas current for 3.3 hours under conditions of a reduced pressure 1.5–3.4 mmHg, 100 rpm and jacket temperature 190° C. by a self-cleaning type twin screw mixer (S1 KRC reactor made by Kurimoto Tekkosho Co., Ltd., inner diameter 25 mm, L/D=10.2) to obtain a high-molecular polyester (18). For this polyester, the number-average molecular weight measured by the GPC was 31,100 and the melting point measured by the DSC was 96.1° C. In addition, a film of 200 μ thickness was made from the polyester by a compression molding machine under conditions of 130° C., 150 kg/cm$^2$ and 2 minutes to measure tensile strength and elongation of the film. As a result, the tensile strength was 285 kg/cm$^2$ and the elongation was 450%.

EXAMPLE 25

To an autoclave were added 250.0 parts of succinic anhydride, 250.0 parts of toluene and 1.50 parts of aluminum isopropoxide. An inside atmosphere of the autoclave was replaced by a nitrogen gas. Then, a temperature of the autoclave was gradually elevated to 120° C. with stirring to dissolve the succinic anhydride. While maintaining an inside pressure of the autoclave in a range of 0.6 to 4.1 kgf/cm$^2$ as a gauge pressure at 120° C., 110 parts of ethylene oxide was continuously introduced into the autoclave for 2.5 hours at the rate of 44 parts an hour. After completion of the introduction of ethylene oxide, an ageing reaction was performed at 120° C. for 55 minutes and then a temperature of a system was reverted to normal temperature. Toluene was removed by evaporation to separate a polymerized product.

The resulting polymerized product was dried under a reduced pressure and then a procedure, wherein the polymerized product was dissolved in chloroform and precipitated in tetrahydrofuran for purification, was thrice repeated to obtain a polyester (10). A yield of this polyester (10) was determined, so that it was 94.1%. In addition, the number-average molecular weight measured by the GPC was 15,200 and the melting point measured by the DSC was 93.5° C.

EXAMPLE 26

To an autoclave were added 390.0 parts of succinic anhydride and 2.20 parts of aluminum isopropoxide. An inside atmosphere of the autoclave was sufficiently replaced by a nitrogen gas. A temperature of the autoclave was gradually elevated to 130° C. to melt the succinic anhydride. Then, while maintaining an inside pressure of the autoclave in a range of 0.3 to 6.7 kgf/cm$^2$ as a gauge pressure at 130° C., 171.7 parts of ethylene oxide was introduced into the autoclave at a reaction temperature of 130° C. for 2.2 hours at the rate of 78 parts an hour. After completion of the introduction of ethylene oxide, an ageing reaction was performed at 130° C. for 100 minutes and then a temperature of a system was reverted to normal temperature, whereby a polymerized product was obtained.

The resulting polymerized product was purified in a manner similar to EXAMPLE 1 to obtain a polyester (11). A yield of this polyester (11) was determined, so that it was 93.0%. In addition, the number-average molecular weight measured by the GPC was 18,900 and the melting point measured by the DSC was 99.4° C.

EXAMPLE 27

To an autoclave were added 500.9 parts of succinic anhydride and 4.93 parts of tetra-n-butoxyzirconium. An inside atmosphere of the autoclave was replaced by a nitrogen gas. Then, a temperature of the autoclave was gradually elevated to 130° C. with stirring to melt the succinic anhydride. While maintaining an inside pressure of the autoclave in a range of 4.0 to 8.4 kgf/cm$^2$ as a gauge pressure at 130° C., 267.0 parts of ethylene oxide was continuously introduced into the autoclave for 5.7 hours at the rate of 47 parts an hour. After completion of the introduction of ethylene oxide, an ageing reaction was performed at 130° C. for 3.0 hours and then a temperature of a system was reverted to normal temperature, whereby a polymerized product was obtained.

A procedure, wherein the resulting polymerized product was dissolved in chloroform and precipitated in tetrahydrofuran for purification, was thrice repeated to obtain a polyester (12). A yield of this polyester (12) was determined, so that it was 99.2%. In addition, the number-average molecular weight measured by the GPC was 21,000 and the melting point measured by the DSC was 102.3° C. A content of a carboxyl group in the polyester was determined by neutralization titration, so that it was 0.0357 mmol/g. These results from measurement show that a ratio of the carboxyl group to terminal ends of the polyester is 37.5%.

The polymerized product, 100.0 parts, was heated with stirring in a nitrogen gas current, 1.90 parts of 2,2'-m-phenylene-bis(2-oxazoline) was added at 190° C., and a reaction was performed for 4.5 hours to obtain a reaction product. A reaction of 70.0 parts of the obtained reaction product with 1.05 parts of diphenyl phosphite was performed in a nitrogen gas current for 2.5 hours under conditions of a reduced pressure 1.0–2.5 mmHg, 100 rpm and jacket temperature 190° C. by a self-cleaning type twin screw mixer (S1 KRC reactor made by Kurimoto Tekkosho Co., Ltd., inner diameter 25 mm, L/D=10.2) to obtain a high-molecular polyester (19). For this polyester, the number-average molecular weight measured by the GPC was 41,000 and the melting point measured by the DSC was 102.6° C. In addition, a film of 200 μ thickness was made from the polyester by a compression molding machine under conditions of 130° C., 150 kg/cm$^2$ and 2 minutes to measure tensile strength and elongation of the film. As a result, the tensile strength was 250 kg/cm$^2$ and the elongation was 420%.

In addition, to examine heat resistance, the high-molecular polyester (19) was heated with stirring in a nitrogen gas current at 190° C. for 2 hours and then the GPC measurement was performed, so that a change in the number-average molecular weight was not recognized.

EXAMPLE 28

A reaction of 70.0 parts of the high-molecular polyester (19), obtained in EXAMPLE 27, with 0.75 parts of titanium tetraisopropoxide was performed in a nitrogen gas current for 3.0 hours under conditions of a reduced pressure 1.0–8.0 mmHg, 100 rpm and jacket temperature 190° C. by a self-cleaning type twin screw mixer (S1 KRC reactor made by Kurimoto Tekkosho Co., Ltd., inner diameter 25 mm, L/D=10.2) to obtain a high-molecular polyester (20). For this polyester, the number-average molecular weight measured by the GPC was 48,000 and the melting point measured by the DSC was 101.5° C. In addition, a film of 200 μ thickness was made from the polyester by a compression molding machine under conditions of 130° C., 150 kg/cm$^2$ and 2 minutes to measure tensile strength and elongation of the film. As a result, the tensile strength was 286 kg/cm$^2$ and the elongation was 415%.

EXAMPLE 29

The polyester (7), 50.0 parts, obtained in EXAMPLE 7, was heated with stirring in a nitrogen gas current, 1.26 parts of pyromellitic dianhydride was added at 190° C., and a reaction was performed for 2 hours to obtain a high-molecular polyester (21). For this polyester, the number-average molecular weight measured by the GPC was 38,000 and the melting point measured by the DSC was 99.1° C. In addition, a film of 200 μ thickness was made from the polyester by a compression molding machine under conditions of 130° C., 150 kg/cm$^2$ and 2 minutes to measure tensile strength and elongation of the film. As a result, the tensile strength was 310 kg/cm$^2$ and the elongation was 400%.

COMPARATIVE EXAMPLE 1

To an autoclave were added 386.2 parts of succinic anhydride and 2.09 parts of aluminum isopropoxide. An inside atmosphere of the autoclave was replaced by a nitrogen gas. Then, a temperature of the autoclave was gradually elevated to 130° C. with stirring to melt the succinic anhydride. While maintaining an inside pressure of the autoclave in a range of 0 to 15.0 kgf/cm$^2$ as a gauge pressure at 130° C., 187.0 parts of ethylene oxide was continuously introduced into the autoclave for 0.5 hours at the rate of 374 parts an hour. After completion of the introduction of ethylene oxide, an ageing reaction was performed at 130° C. for 2.0 hours and then a temperature of a system was reverted to normal temperature, whereby a polymerized product was obtained.

A procedure, wherein the resulting polymerized product was dissolved in chloroform and precipitated in tetrahydrofuran for purification, was thrice repeated to obtain a comparative polyester (1). A yield of this comparative polyester (1) was determined, so that it was 82.6%. In addition, the number-average molecular weight measured by the GPC was 10,500 and the melting point measured by the DSC was 88.5° C.

COMPARATIVE EXAMPLE 2

To an autoclave were added 507.5 parts of succinic anhydride, 2.74 parts of aluminum isopropoxide and 31.48 parts of ethylene glycol. An inside atmosphere of the autoclave was replaced by a nitrogen gas. Then, a temperature of the autoclave was gradually elevated to 135° C. with stirring to melt the succinic anhydride. While maintaining an inside pressure of the autoclave in a range of 3.0 to 8.4 kgf/cm$^2$ as a gauge pressure at 135° C., 245.7 parts of ethylene oxide was continuously introduced into the autoclave for 5 hours at the rate of 49 parts an hour. After completion of the introduction of ethylene oxide, an ageing reaction was performed at 135° C. for 2.0 hours and then a temperature of a system was reverted to normal temperature, whereby a polymerized product was obtained.

A procedure, wherein the resulting polymerized product was dissolved in chloroform and precipitated in tetrahydrofuran for purification, was thrice repeated to obtain a comparative polyester (2). A yield of this comparative polyester (2) was determined, so that it was 91.2%. In addition, the number-average molecular weight measured by the GPC was 2,100 and the melting point measured by the DSC was 89.5° C.

COMPARATIVE EXAMPLE 3

To an autoclave were added 508.7 parts of succinic anhydride, 2.75 parts of aluminum isopropoxide and 118.1 parts of succinic acid. An inside atmosphere of the autoclave was replaced by a nitrogen gas. Then, a temperature of the autoclave was gradually elevated to 135° C. with stirring to melt the succinic anhydride. While maintaining an inside pressure of the autoclave in a range of 3.0 to 8.1 kgf/cm$^2$ as a gauge pressure at 135° C., 246.3 parts of ethylene oxide was continuously introduced into the autoclave for 5 hours at the rate of 49 parts an hour. After completion of the introduction of ethylene oxide, an ageing reaction was performed at 135° C. for 2.0 hours and then a temperature of a system was reverted to normal temperature, whereby a polymerized product was obtained.

A procedure, wherein the resulting polymerized product was dissolved in chloroform and precipitated in tetrahydrofuran for purification, was thrice repeated to obtain a comparative polyester (3). A yield of this comparative polyester (3) was determined, so that it was 93.8%. In addition, the number-average molecular weight measured by the GPC was 2,400 and the melting point measured by the DSC was 94.0° C.

COMPARATIVE EXAMPLE 4

To an autoclave were added 250.0 parts of succinic anhydride, 110.0 parts of ethylene oxide and 200.0 parts of toluene. The added succinic anhydride was dissolved with stirring and an inside atmosphere of the autoclave was sufficiently replaced by a nitrogen gas. Then, a temperature of the autoclave was gradually elevated to 80° C. Then, to the autoclave was added a solution which was prepared by dissolving 4.2 parts of aluminum isopropoxide in 50 parts of toluene, whereby a polymerization reaction was performed by maintaining the autoclave temperature at 80° C. for 4 hours. After completion of the polymerization reaction, a temperature of a system was reverted to normal temperature and toluene was removed by evaporation to obtain a polymerized product.

The resulting polymerized product was purified in a manner similar to EXAMPLE 1 to obtain a comparative polyester (4). A yield of this comparative polyester (4) was determined, so that it was 78.5%. In addition, the number-average molecular weight measured by the GPC was 11,000 and the melting point measured by the DSC was 63.5° C.

COMPARATIVE EXAMPLE 5

The polyester (1) obtained in EXAMPLE 1 was heated with stirring in a nitrogen gas current at 190° C. for 2 hours and then the GPC measurement was performed, so that the number-average molecular weight was 10,000. In addition, a film of 200$\mu$ thickness was made from the polyester (1) by a compression molding machine under conditions of 130° C., 150 kg/cm$^2$ and 2 minutes. However, the resulting film was fragile and therefore tensile strength and elongation could not be measured.

TABLE 1

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
| --- | --- | --- | --- | --- | --- | --- | --- | --- |
| Polyester No. | (1) | (2) | (3) | (4) | (5) | (6) | (7) | (8) |
| Yield (%) | 96.2 | 91.5 | 99.0 | 98.6 | 98.6 | 92.1 | 98.2 | 99.1 |
| Number-average molecular weight | 13,100 | 19,500 | 17,000 | 11,600 | 24,000 | 13,000 | 20,500 | 18,000 |
| Melting point (°C.) | 97.8 | 100.2 | 105.1 | 91.7 | 97.7 | 90.0 | 97.5 | 95.9 |
| Biodegradability | (+) | (+) | (+) | (+) | (+) | (+) | (+) | (+) |

TABLE 2

| | EXAMPLE 22 | EXAMPLE 25 | EXAMPLE 26 | EXAMPLE 27 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|
| Polyester No. | (9) | (10) | (11) | (12) | Comparative (1) | Comparative (2) | Comparative (3) | Comparative (4) |
| Yield (%) | 98.3 | 94.1 | 93.0 | 99.2 | 82.6 | 91.2 | 93.8 | 78.5 |
| Number-average molecular weight | 22,500 | 15,200 | 18,900 | 21,000 | 10,500 | 2,100 | 2,400 | 11,000 |
| Melting point (°C.) | 97.8 | 93.5 | 99.4 | 102.3 | 88.5 | 89.5 | 94.0 | 63.5 |
| Biodegradability | (+) | (+) | (+) | (+) | (+) | (+) | (+) | (+) |

TABLE 3

| | EXAMPLE 7 | EXAMPLE 8 | EXAMPLE 9 | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|---|---|
| High-molecular polyester No. | (1) | (2) | (3) | (4) | (5) | (6) | (7) | (8) | (9) | (10) |
| Number-average molecular weight | 31,000 | 33,000 | 35,000 | 38,000 | 27,000 | 26,000 | 42,000 | 36,000 | 39,000 | 46,000 |
| Melting point (°C.) | 98.8 | 96.8 | 96.5 | 96.1 | 90.8 | 97.2 | 99.8 | 98.2 | 97.5 | 104.8 |
| Tensile fracture point (kg/cm$^2$) | 185 | 195 | 189 | 210 | 115 | 100 | 210 | 200 | 195 | 220 |
| Fracture elongation (%) | 420 | 450 | 380 | 430 | 360 | 280 | 490 | 280 | 420 | 510 |
| Biodegradability | (+) | (+) | (+) | (+) | (+) | (+) | (+) | (+) | (+) | (+) |

TABLE 4

| | EXAMPLE 17 | EXAMPLE 18 | EXAMPLE 19 | EXAMPLE 20 | EXAMPLE 21 | EXAMPLE 22 | EXAMPLE 23 | EXAMPLE 24 | EXAMPLE 27 | EXAMPLE 28 | EXAMPLE 29 |
|---|---|---|---|---|---|---|---|---|---|---|---|
| High-molecular polyester No. | (11) | (12) | (13) | (14) | (15) | (16) | (17) | (18) | (19) | (20) | (21) |
| Number-average molecular weight | 32,000 | 40,500 | 41,500 | 30,000 | 31,000 | 29,000 | 34,100 | 31,100 | 41,000 | 48,000 | 38,000 |
| Melting point (°C.) | 90.2 | 98.8 | 97.1 | 96.8 | 97.8 | 97.9 | 97.8 | 96.1 | 102.6 | 101.5 | 99.1 |
| Tensile fracture point (kg/cm$^2$) | 180 | 215 | 200 | 175 | 165 | 150 | 265 | 285 | 250 | 286 | 310 |
| Fracture elongation (%) | 400 | 400 | 395 | 370 | 320 | 310 | 430 | 450 | 420 | 415 | 400 |
| Biodegradability | (+) | (+) | (+) | (+) | (+) | (+) | (+) | (+) | (+) | (+) | (+) |

What is claimed is:

1. A process for producing a polyester, comprising the steps of:

placing a cyclic acid anhydride containing succinic anhydride as a main component in a reaction vessel, said cyclic acid anhydride being in a melting state or solution state; and introducing successively a cyclic ether containing ethylene oxide as a main component into said reaction vessel, wherein the rate per hour of introducing said cyclic ether is within the range of 3 to 90 parts by weight per 100 parts by weight of said cyclic acid anhydride, and wherein said reaction vessel has an inside pressure within the range of atmospheric pressure to 50 kgf/cm$^2$ as a gauge pressure, whereby a ring-opening copolymerization reaction of said cyclic acid anhydride with said cyclic ether carried out to form a polyester.

2. The process as claimed in claim 1, wherein the step of placing said cyclic acid anhydride includes placing a polymerization catalyst in said reaction vessel.

3. The process as claimed in claim 2, wherein said polymerization catalyst is a metal alkoxide compound.

4. The process as claimed in claim 3, wherein the metal alkoxide compound is at least one member selected from the group consisting of trialkoxyaluminum compounds, tetraalkoxytitanium compounds, tetraalkoxyzirconium compounds and dialkoxyzinc compounds.

5. The process as claimed in claim 4, wherein the metal alkoxide compound is at least one member selected from the group consisting of trialkoxyaluminum compounds.

6. The process as claimed in claim 2, wherein the amount of the catalyst is in the range of 0.001 to 10% by weight based on a total amount of the cyclic acid anhydride and cyclic ether.

7. The process as claimed in claim 1, wherein said cyclic ether is introduced into said reaction vessel in total within the range of 60/40 to 40/60 in ratio by mole based on said cyclic acid anhydride.

8. The process as claimed in claim 1, further comprising a step of introducing at least one chain-elongating agent selected from the group consisting of an oxazoline compound, a phosphoric acid ester, a phosphorous acid ester, a polyvalent metal compound and a polyfunctional acid anhydride into a reaction vessel containing the polyester, whereby a chain-elongating reaction of the polyester is carried out.

9. The process as claimed in claim 8, wherein said chain-elongating agent is at least one member selected from a group consisting of an oxazoline compound, a phosphoric acid ester and a phosphorous acid ester; and said chain-elongating agent is used in a ratio of 0.001 to 10% by weight based on the polyester.

10. The process as claimed in claim 8, wherein the polyvalent metal compound is selected from the group consisting of organic compounds of a metal having a valence of 2 or more and salts of a metal having a valence of 2 or more, and used in a ratio by mole of 0.1 to 2.0 based on all carboxyl groups of the polyester.

11. The process as claimed in claim 8, wherein the polyvalent metal compound is selected from the group consisting of alkoxides of a metal having a valence of 2 or more, and used in a ratio by mole of 0.1 to 2.0 based on all hydroxyl groups of the polyester.

12. The process as claimed in claim 8, wherein the polyfunctional acid anhydride is used in a ratio by mole of 0.1 to 5.0 of acid anhydride groups of the polyfunctional acid anhydride based on all hydroxyl groups of the polyester.

* * * * *